Figure 1:
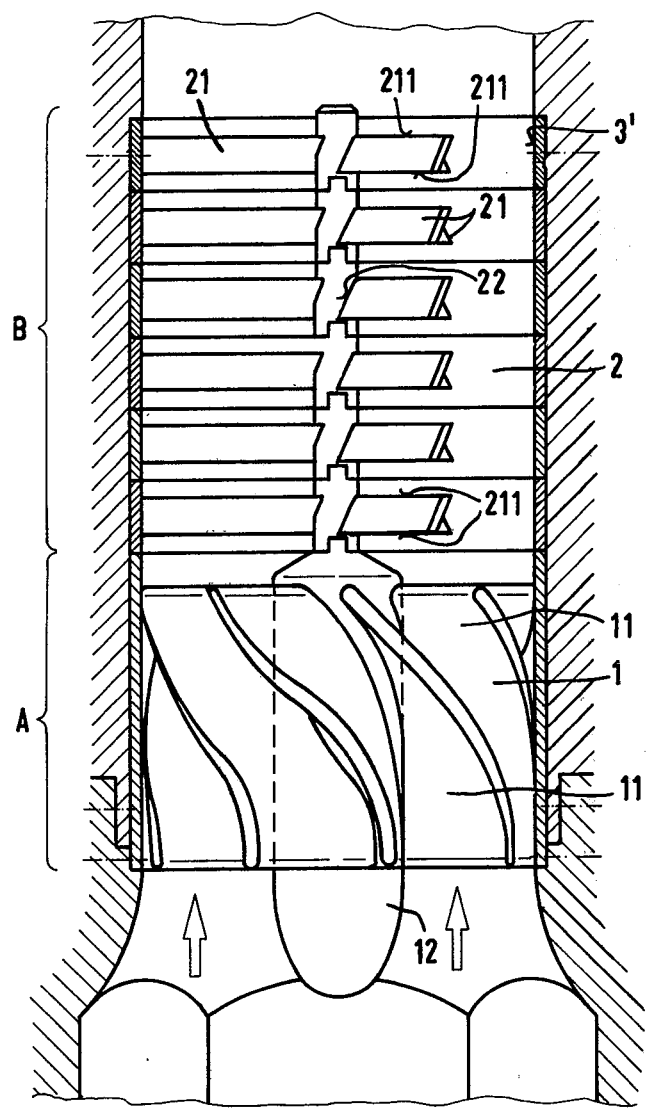

United States Patent [19]

Benemann et al.

[11] 4,132,115

[45] Jan. 2, 1979

[54] DEVICE FOR PRODUCING CONDITIONS IN A FLOWING MEDIUM, ESPECIALLY IN A NUCLEAR REACTOR, PERMITTING MEASUREMENT OF A REPRESENTATIVE TEMPERATURE

[75] Inventors: Annelie Benemann, Bergisch Gladbach; Norbert Schult, Much (Siegkreis); Peter Voj, Rösenrath; Bernhard Hosemann, Berlin, all of Germany

[73] Assignee: INTERATOM, Internationale Atomreaktorbau GmbH, Bensberg, Germany

[21] Appl. No.: 790,469

[22] Filed: Apr. 25, 1977

[30] Foreign Application Priority Data

Apr. 30, 1976 [DE] Fed. Rep. of Germany ....... 2619218

[51] Int. Cl.² .............................................. G01K 1/00
[52] U.S. Cl. ...................................... 73/349; 176/19 R
[58] Field of Search ................. 73/349, 112, 115, 116, 73/117.4, 154; 259/4 AC, 4 AB; 176/19 R, 54

[56] References Cited

U.S. PATENT DOCUMENTS

| 2,631,677 | 3/1953 | Kochenburger | 73/349 |
| 3,369,972 | 2/1968 | Seymour | 176/19 R |
| 3,629,065 | 12/1971 | Knox | 176/54 |
| 3,899,390 | 8/1975 | Klein et al. | 176/19 R |

*Primary Examiner*—Donald O. Woodiel
*Attorney, Agent, or Firm*—Herbert L. Lerner

[57] ABSTRACT

Device for producing conditions in a flowing medium permitting measurement of a representative temperature includes a twist-producing stage and a twist-reducing stage disposed serially in flow direction of the flowing medium within the flow cross section thereof and upstream of a temperature measuring sensor.

19 Claims, 2 Drawing Figures

DEVICE FOR PRODUCING CONDITIONS IN A FLOWING MEDIUM, ESPECIALLY IN A NUCLEAR REACTOR, PERMITTING MEASUREMENT OF A REPRESENTATIVE TEMPERATURE

The invention relates to a device for producing conditions in a flowing medium permitting measurement of a representative temperature, especially in a coolant discharging from the fuel element of a nuclear reactor.

In the case of a temperature of a flowing or streaming medium wherein the temperature appears uniformly over the entire flow cross section, the measurement of this temperature generally causes no difficulty at all. If different temperatures, for example, warmer or colder flow zones are present, however, at the margin or periphery as compared to the center of a blowing medium within the flow cross-section zones, then either the introduction of a multiplicity of temperature measuring sensors and means for compensating the measurement results or an intermixing of the flowing medium in such a manner that, before acting upon a single temperature measuring sensor, partial exchange, for example, of the flow zones at the margin or periphery with those in the middle of the flow cross section occurs, is required in order to obtain a representative temperature value as a measurement result. A combination of both of the foregoing required measures or features is also conceivable.

Measures or features of the aforementioned type, however, under special conditions, namely when non-uniform, such as non-circularly symmetrical distribution of relatively warm and relatively cold and additionally, if desired, alternatingly warm and cold flow zones exist over the flow cross section, are either insufficient, unsuitable and/or nonapplicable. An example of such a case is the measuring of a representative temperature of the coolant discharging from a fuel element of a nuclear reactor.

Strands of varying temperature occur in the coolant that flows through and between the rods, including the fuel and breeder rods, of the core element of a nuclear reactor and thereafter discharges from the core element, when the power distribution in the core element is non-uniform and alternates in accordance with the respective operating condition. This phenomenon can result from many different causes such as the local disposition of the various core elements, including the fuel, breeder and absorber elements, for example, to one another which are additionally exchanged, or the bending of an individual rod or all of the rods or of the jacket or can of the core element. In order, under such conditions, to effect measurement of a representative temperature of the coolant by disposing a plurality of temperature measuring sensors and compensating the measurement results, it would be necessary, from a practical standpoint, to place temperature measuring sensors virtually side by side. This is impractical both for reasons of construction and economy. Thus, only the possibility remains of providing the respective core element with one temperature measuring sensor, which is then disposed together or in common with a throughput measuring sensor at a guide tube or the like, the guide tube, also, and the temperature measuring sensor therewith being able to experience lateral deviations with respect to the axis of the core element. The temperature measuring sensor thereby comes into contact with different flow filaments or strands so that the measurement result cannot be characterized as representative and as adequate for monitoring use.

It is accordingly an object of the invention to provide a device for producing conditions in a flowing medium permitting measurement of a representative temperature, especially in the coolant discharging from the core element, with which, also under the most difficult and continuously varying requirements, as can exist or can occur, for example, in a nuclear core element, authentic results and results that are adequately reliable for monitoring, for example, the operation of a nuclear reactor, can be attained at low constructive expense and with elements that are of rugged construction.

With the foregoing and other objects in view, there is provided, in accordance with the invention, a device for producing conditions in a flowing medium permitting measurement of a representative temperature comprising a twist-producing stage and a twist-reducing stage disposed serially in a flow direction of the flowing medium within the flow cross section thereof and upstream of a temperature measuring sensor.

In accordance with another feature of the invention, the twist-reducing stage is disposed directly downstream of the twist-producing stage in the flow direction of the medium.

In accordance with a further feature of the invention, the twist-producing stage is formed of a twist member comprising a plurality of spatially curved guide plates.

In accordance with an added feature of the invention, the plurality of spatially curved guide plates are substantially helically and circularly symmetrically disposed blades.

In accordance with yet another feature of the invention, the twist-reducing stage, as a rectifier, is formed of a plurality of rib-like members extending from inclined to perpendicularly to the flow direction of the flowing medium.

In accordance with yet a further feature of the invention, the rib-like members are members selected from the group consisting of ribs, mandrels, rods and narrow blades.

What is accomplished thereby is that pressure energy provided upstream of the twist member is transformed into flow energy by the twist member, and the flow energy is re-converted into pressure energy in the twist-reducing stage, distributed virtually over the entire length thereof. In this manner, entirely with only a small energy loss and with relatively simple, immobile means, in addition, an intermixing of the flowing or streaming medium, such as reactor coolant, of all temperature strands or filaments thereof is achieved to a very great extent of mixing over the entire flow cross section.

This means that both radial as well as axial variations in the location of the temperature measuring sensor with respect to the fuel element, or the like, have no effect upon the temperature measurement and that the measurement result actually provides the representative temperature prevailing in the flowing medium. Accordingly, the device of the invention has proven to be advantageously applicable and suited, even for very great demands such as are made for monitoring the operation of a nuclear reactor.

In accordance with an additional feature of the invention, the guide plates are disposed on a substantially stream-lined hub.

In accordance with a further feature of the invention, the device includes means having a wall surface for defining the flow cross section, the rib-like members extending substantially from the axis of the flow cross section or channel in radial direction up to at least near the wall surface.

In accordance with an added feature of the invention, the rib-like members extend over the entire flow cross section.

In accordance with an additional feature of the invention, the twist-producing stage is formed of a plurality of spatially curved guide plates, and a substantially stream-lined hub whereon the guide plates are disposed, the hub having a downstream extension in flow direction of the medium, and the twist-reducing stage is formed of a plurality of rib-like members extending from inclined to perpendicularly to the flow direction of the medium, at least part of the rib-like members being disposed on the downstream extension of the hub.

In accordance with yet another feature of the invention, the extension has a smaller cross section than that of the hub.

In accordance with yet a further feature of the invention, the rib-like members are disposed in sets serially in flow direction of the medium.

In accordance with another feature of the invention, the sets of rib-like members are disposed in respective planes extending radially to the axis.

In accordance with a further feature of the invention, the rib-like members have a cross section that is substantially flat in width, and are directed at an adjustment angle inclined to the direction of flow of the medium in a manner similar to that of an airscrew or propeller, and may be adjustable thereto.

In accordance with yet another feature of the invention, the rib-like members have radially varying adjustment angles.

In accordance with yet an added feature of the invention, the rib-like members respectively have a pair of narrow surfaces, at least one of which is disposed substantially in a plane extending perpendicularly to the axis.

In accordance with yet an additional feature of the invention, the twist-producing stage is formed of a twist member comprising a plurality of substantially helically and circularly symmetrially disposed blades, and the adjusting angles of the rib-like members and the pitch of the helically disposed blades differ from one another.

In accordance with another feature of the invention, the adjusting angles of the rib-like members and the pitch of the helically disposed blades are directed opposite to one another.

In accordance with a further feature of the invention, the twist-reducing stage has a greater length in flow direction of the medium than that of the twist-producing stage.

What is attained thereby is that the transformation or conversion of the twist energy into pressure energy is distributed over an axial section that is relatively long or large in comparison to that of the twist-producing stage, and that this transformation or conversion thus occurs gradually. What matters, therefore, is to attain a high mixing grade in common with the aforementioned measures or features and accordingly avoid disadvantageous effects such as the production of cavitation.

In accordance with an added feature of the invention, the device is in combination with a nuclear fuel element having a jacket-like can and formed with a fuel element head, the twist-producing and the twist reducing stages being received in a sleeve, and the sleeve, in a lower section thereof, having a cross section matching funnel-like the cross section of the fuel element can and being disposed in vicinity of the fuel element head.

In accordance with a concomitant feature of the invention, the device includes an equalizing or compensating stage in the form of a flow channel free of obstructions or built-in structures and disposed within the fuel element head between the twist-reducing stage and the temperature measuring sensor.

Other features which are considered as characteristic for the invention are set forth in the appended claims.

Although the invention is illustrated and described herein as embodied in device for producing conditions in a flowing medium, especially in a nuclear reactor, permitting measurement of a representative temperature, it is nevertheless not intended to be limited to the details shown, since various modifications and structural changes may be made therein without departing from the spirit of the invention and within the scope and range of equivalents of the claims.

Figure 2:
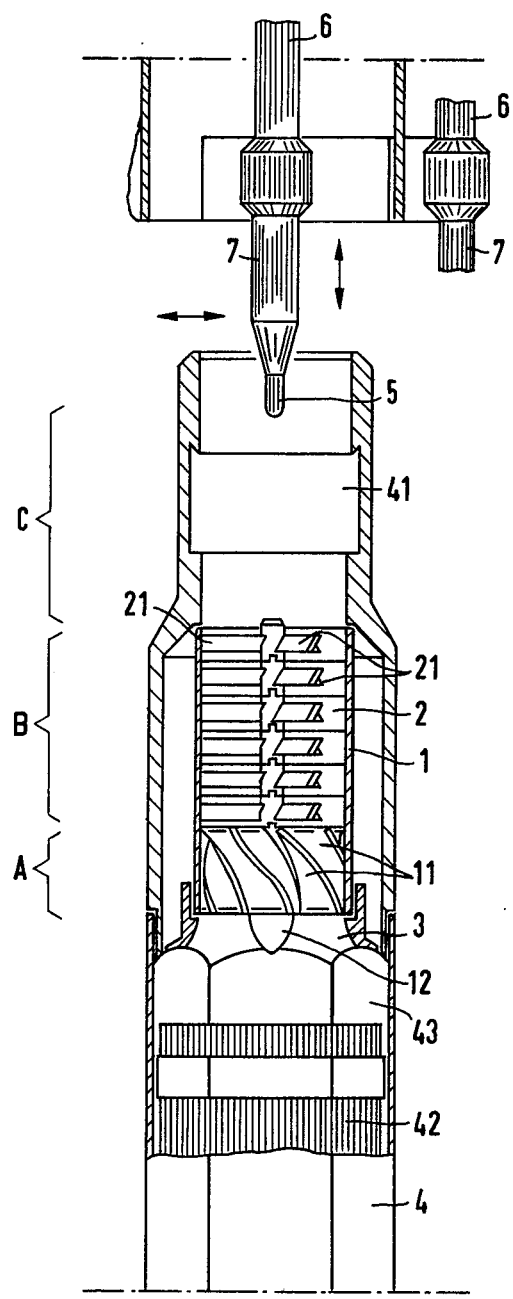

The construction and method of operation of the invention, however, together with additional objects and advantages thereof will be best understood from the following description of specific embodiments when read in connection with the accompanying drawings, in which:

FIG. 1 is a longitudinal sectional view of a device for producing conditions in a flowing medium permitting measurement of a representative temperature, in accordance with the invention; and FIG. 2 is a reduced view similar to that of FIG. 1 of a similar embodiment of the invention which is employed, however, for measuring the representative temperature in the coolant discharging from a core element of a nuclear reactor.

Referring now to the figures of the drawing, there is shown therein the device of the invention which is formed of a swirl or twist-producing stage A having a twist member 1, and a twist-reducing stage B with a rectifier 2, that are disposed in order, one after the other, in direction of flow of a flowing medium or, in the case of a nuclear reactor, a flowing coolant, along a flow cross section defined by a wall 3' or a sleeve 3. The twist-reducing stage B is located directly behind the twist-producing stage A.

According to FIG. 2, the device of the invention is disposed in a sleeve 3, and the latter is accommodated in the head section 41 of a core element 4 above the core element-rod bundle, which contains other element rods, the sleeve 3 having a lower section which matches funnel-like the six-sided contour of the fuel-element can or jacket 43. An equalizing or compensating section or stage C follows the twist-producing stage A and the twist-reducing stage B, connected to the latter. A temperature measuring sensor 5 for the express purpose of measuring the representative temperature of the flowing medium, which, in the instant case, is coolant discharging from the core element 4 or from the rod bundles 42, is located substantially at the end of the equalizing or compensating stage C. The temperature measuring sensor 5 is disposed at the lower end of a guide tube 6 which also carries a throughput measuring sensor 7. The double-headed arrows in FIG. 2 illustrate or represent which relative variations in location can occur between the core element 4 and the temperature measuring sensor 5 during operation. In order to obtain a representative temperature as a measurement result, it is a prerequisite that these location or position variations have no effect upon the measuring result.

According to FIGS. 1 and 2, the twist-producing stage A is formed essentially of a plurality of spatially curved or, in other words, helically and circularly symmetrically disposed blades 11 which are located on a streamlined hub 12 and, together with the latter, constitute the twist member 1.

The twist-reducing stage B or the rectifier 2 is formed of a plurality of ribs 21 which extend from the axis of the flow cross section or channel in radial direction up to the wall 3' or the sleeve 3 and are disposed in sets one behind the other in flow direction in respective planes extending radially to the axis, and secured to a downstream extension 22 of the hub 12 as viewed in flow direction of the medium. Although not specifically shown in the figures, the ribs 21 may be mounted so as to be rotatable or adjustable entirely or in sections about the longitudinal axis of the rearward extension 22 of the hub 12. The ribs 21 have a cross section that is substantially flat in width, the narrow surfaces or areas 211 thereof being disposed in planes extending perpendicularly to the axis. Of particular importance for the twist reducing action or the action wherein the flow energy is transformed into pressure energy is the adjustment angle inclined to the flow or streaming direction and directed oppositely to the pitch or lead of the blades 11 of the twist-producing stage A.

The twist-reducing stage B has, in flow direction, a greater length than that of the twist-producing stage A so that the twist or flow energy is very gradually retransformed into pressure energy. Due to the operation thereof, initially transforming pressure energy relatively rapidly into twist energy, and retransforming the latter then relatively slowly into pressure energy, the attainment of a very good mixing action both in radial as well as in axial direction within the streaming or flowing medium or coolant is effected to a marked extent.

This inventive feature, namely the disposition of the hereinaforementioned twist-producing and twist-reducing stages A and B, respectively, results in that a turbulent intermixing of the flowing or streaming medium or fluid is effected at the individual ribs 21, or the like, of the rectifier 2, due to the transformation of flow energy previously produced by means of the twist member 1, or the like, into pressure energy, and further results in that the additional, sought-after flow guidance within the rectifier stage B besides the components attained through turbulent mixing, as a second value, promotes optimization of the extent of mixing.

By varying the determining parameter, such as the outlet angle of the blades of the twist member 1, the form or forms, disposition, number, setting as well as adjustment angle of the ribs, parts of the ribs or the like in the rectifier or twist-reducing stage B, the pressure loss as well as a maximal deviation of the temperature at the temperature measuring sensor from an actual mean temperature can be determined or kept so small that they have no disadvantageous effect in actual practice.

There are claimed:

1. Device for producing conditions in a flowing medium permitting measurement of a representative temperature comprising a twist-producing stage and a twist-reducing stage disposed serially in flow direction of the flowing medium within the flow cross section thereof and upstream of a temperature measuring sensor, said twist-producing stage being formed of a twist member comprising a plurality of spatially curved guide plates.

2. Device according to claim 1 wherein said plurality of spatially curved guide plates are substantially helically and circularly symmetrically disposed blades.

3. Device according to claim 1 wherein said guide plates are disposed on a substantially stream-lined hub.

4. Device for producing conditions in a flowing medium permitting measurement of a representative temperature comprising a twist-producing stage and a twist-reducing stage disposed serially in flow direction of the flowing medium within the flow cross section thereof and upstream of a temperature measuring sensor, said twist-reducing stage, as a rectifier, being formed of a plurality of rib-like members extending from inclined to perpendicularly to the flow direction of the flowing medium.

5. Device according to claim 4 wherein said rib-like members are members selected from the group consisting of ribs, mandrels, rods and narrow blades.

6. Device according to claim 4 including means having a wall surface for defining the flow cross section, said rib-like members extending substantially from the axis of the flow cross section in radial direction up to at least near said wall surface.

7. Device according to claim 6 wherein said rib-like members extend over the entire flow cross section.

8. Device according to claim 4 wherein said twist-producing stage is formed of a plurality of spatially curved guide plates, and a substantially stream-lined hub whereon said guide plates are disposed, said hub having a downstream extension in flow direction of the medium, and said twist-reducing stage is formed of a plurality of rib-like members extending from inclined to perpendicularly to the flow direction of the medium, at least part of said rib-like members being disposed on said downstream extension of said hub.

9. Device according to claim 8 wherein said extension has a smaller cross section than that of said hub.

10. Device according to claim 4 wherein said rib-like members are disposed in sets serially in flow direction of the medium.

11. Device according to claim 10 wherein said sets of rib-like members are disposed in respective planes extending radially to the axis.

12. Device according to claim 4 wherein said rib-like members have a cross section that is substantially flat in width, and are directed at an adjustment angle inclined to the direction of flow of the medium in a manner similar to that of an airscrew.

13. Device according to claim 12 wherein said rib-like members have radially varying adjustment angles.

14. Device according to claim 12 wherein said rib-like members respectively have a pair of narrow surfaces, at least one of which is disposed substantially in a plane extending perpendicularly to the axis.

15. Device according to claim 12 wherein said twist-producing stage is formed of a twist member comprising a plurality of substantially helically and circularly symmetrically disposed blades, and said adjusting angles of said rib-like members and the pitch of said helically disposed blades differ from one another.

16. Device according to claim 15 wherein said adjusting angles of said rib-like members and the pitch of said helically disposed blades are directed opposite to one another.

17. Device for producing conditions in a flowing medium permitting measurement of a representative temperature comprising a twist-producing stage and a twist-reducing stage disposed serially in flow direction of the flowing medium within the flow cross section thereof and upstream of a temperature measuring sensor, said twist-reducing stage having a greater length in flow direction of the medium than that of the twist-producing stage.

18. Device for producing conditions in a flowing medium permitting measurement of a representative temperature comprising a twist-producing stage and a twist-reducing stage disposed serially in flow direction of the flowing medium within the flow cross section thereof and upstream of a temperature measuring sensor, in combination with a nuclear fuel element having a jacket-like can and formed with a fuel element head, said twist-producing and said twist-reducing stages being received in a sleeve, and said sleeve, in a lower section thereof, having a cross section matching funnel-like the cross section of a fuel element can and being disposed in vicinity of said fuel element head.

19. Device according to claim 18 including an equalizing stage in the form of a flow channel free of obstructions is disposed within said fuel element head between said twist-reducing stage and the temperature measuring sensor.

* * * * *